United States Patent
Delpuch et al.

(10) Patent No.: US 8,201,208 B2
(45) Date of Patent: Jun. 12, 2012

(54) CAROUSEL PROXY

(75) Inventors: Alain Delpuch, Les Essarts le Roi (FR);
Bryan Gebhardt, Fremont, CA (US);
Houman Azarm, Oakland, CA (US);
Steven Berriatua, San Carlos, CA (US)

(73) Assignee: OpenTV, Inc., San Francisco, CA (US)

( * ) Notice: Subject to any disclaimer, the term of this patent is extended or adjusted under 35 U.S.C. 154(b) by 1243 days.

(21) Appl. No.: 10/652,850

(22) Filed: Aug. 29, 2003

(65) Prior Publication Data
US 2004/0128699 A1 Jul. 1, 2004

Related U.S. Application Data

(60) Provisional application No. 60/407,325, filed on Aug. 30, 2002.

(51) Int. Cl.
*H04N 7/173* (2006.01)
(52) U.S. Cl. .............. 725/119; 725/36; 725/37; 725/54; 725/114; 725/118; 725/127
(58) Field of Classification Search .................... 725/36, 725/54, 127
See application file for complete search history.

(56) References Cited

U.S. PATENT DOCUMENTS

| | | |
|---|---|---|
| 4,751,578 A | 6/1988 | Reiter et al. |
| 5,093,718 A | 3/1992 | Hoarty et al. |
| 5,307,173 A | 4/1994 | Yuen et al. |
| 5,334,975 A | 8/1994 | Wachob et al. |
| 5,343,239 A | 8/1994 | Lappington et al. |
| 5,400,402 A | 3/1995 | Garfinkle |
| 5,448,568 A | 9/1995 | Delpuch et al. |
| 5,504,896 A | 4/1996 | Schell et al. |
| 5,539,920 A | 7/1996 | Menand et al. |
| 5,557,317 A | 9/1996 | Nishio et al. |

(Continued)

FOREIGN PATENT DOCUMENTS

EP 9942595 A2 3/1999

(Continued)

OTHER PUBLICATIONS

Advanced Television Enhancement Forum Specification (ATVEF), Version 1.1r26, Feb. 2, 1999, pp. 1-37.

(Continued)

*Primary Examiner* — Scott Beliveau
*Assistant Examiner* — Kunal Langhnoja
(74) *Attorney, Agent, or Firm* — Schwegman, Lundberg & Woessner, P.A.

(57) ABSTRACT

A broadcaster generates programming content and a carousel containing chunks of data defining one or more interactive applications. The programming content and carousel are received by a local gateway which distributes the carousel and content to receivers at end-users via a distribution network. A carousel proxy in the local gateway receives the inbound carousel from the broadcaster and modifies it to produce an outbound carousel suited for the distribution network, receivers, and/or end-users. The modifications performed by the carousel proxy include filtering chunks and/or data within the chunks from the inbound carousel and transforming data within the chunks to customize the interactive applications for the distribution network, receivers, and/or end-users. The carousel proxy also caches chunks in a cache of a local data store. The carousel proxy uses the cached chunks to send the outbound carousel at a rate optimized for the bandwidth available on the distribution network.

17 Claims, 3 Drawing Sheets

U.S. PATENT DOCUMENTS

| | | | |
|---|---|---|---|
| 5,559,550 A | 9/1996 | Mankovitz | |
| 5,563,648 A | 10/1996 | Menand et al. | |
| 5,583,563 A | 12/1996 | Wanderscheid et al. | |
| 5,585,858 A | 12/1996 | Harper et al. | |
| 5,586,264 A | 12/1996 | Belknap et al. | |
| 5,652,615 A | 7/1997 | Bryant et al. | |
| 5,657,072 A | 8/1997 | Aristides et al. | |
| 5,675,373 A | 10/1997 | Joiner et al. | |
| 5,689,799 A | 11/1997 | Dougherty et al. | |
| 5,699,105 A | 12/1997 | Chen et al. | |
| 5,719,618 A | 2/1998 | Park | |
| 5,729,279 A | 3/1998 | Fuller | |
| 5,768,539 A | 6/1998 | Metz et al. | |
| 5,774,664 A | 6/1998 | Hidary et al. | |
| 5,781,228 A | 7/1998 | Sposato | |
| 5,790,198 A | 8/1998 | Roop et al. | |
| 5,818,440 A | 10/1998 | Allibhoy et al. | |
| 5,819,034 A | 10/1998 | Joseph et al. | |
| 5,826,166 A | 10/1998 | Brooks et al. | |
| 5,835,717 A | 11/1998 | Karlton et al. | |
| 5,848,352 A | 12/1998 | Dougherty et al. | |
| 5,850,447 A | 12/1998 | Peyret | |
| 5,861,881 A | 1/1999 | Freeman et al. | |
| 5,872,589 A | 2/1999 | Morales | |
| 5,880,720 A | 3/1999 | Iwafume et al. | |
| 5,931,908 A | 8/1999 | Gerba et al. | |
| 5,937,331 A * | 8/1999 | Kalluri et al. | 725/146 |
| 5,970,206 A | 10/1999 | Yuen et al. | |
| 5,973,684 A * | 10/1999 | Brooks et al. | 715/716 |
| 5,974,222 A | 10/1999 | Yuen et al. | |
| 6,006,256 A * | 12/1999 | Zdepski et al. | 725/114 |
| 6,008,802 A | 12/1999 | Iki et al. | |
| 6,018,768 A | 1/2000 | Ullman et al. | |
| 6,021,433 A | 2/2000 | Payne et al. | |
| 6,061,719 A | 5/2000 | Bendinelli et al. | |
| 6,064,438 A * | 5/2000 | Miller | 348/465 |
| 6,181,335 B1 | 1/2001 | Hendricks et al. | |
| 6,188,871 B1 | 2/2001 | Kitamura et al. | |
| 6,256,785 B1 | 7/2001 | Klappert et al. | |
| 6,295,647 B1 | 9/2001 | Ramaswamy | |
| 6,415,438 B1 | 7/2002 | Blackketter et al. | |
| 6,421,358 B1 | 7/2002 | Stimmel et al. | |
| 6,530,082 B1 * | 3/2003 | Del Sesto et al. | 725/9 |
| 6,530,084 B1 * | 3/2003 | Del Sesto et al. | 725/61 |
| 6,760,765 B1 | 7/2004 | Asai et al. | |
| 2001/0037507 A1 | 11/2001 | Mori | |
| 2002/0078209 A1 * | 6/2002 | Peng | 709/227 |
| 2002/0108121 A1 * | 8/2002 | Alao et al. | 725/110 |
| 2002/0112240 A1 * | 8/2002 | Bacso et al. | 725/47 |
| 2002/0138500 A1 * | 9/2002 | Bechtel et al. | 707/104.1 |
| 2002/0194615 A1 | 12/2002 | Brodigan et al. | |
| 2003/0005455 A1 | 1/2003 | Bowers | |
| 2003/0005465 A1 | 1/2003 | Connelly | |
| 2003/0056218 A1 * | 3/2003 | Wingard et al. | 725/46 |
| 2003/0070165 A1 * | 4/2003 | Houldsworth | 725/25 |
| 2004/0250295 A1 | 12/2004 | Lesenne et al. | 725/135 |
| 2006/0117340 A1 * | 6/2006 | Pavlovskaia et al. | 725/34 |
| 2007/0130581 A1 * | 6/2007 | Del Sesto et al. | 725/36 |

FOREIGN PATENT DOCUMENTS

| | | |
|---|---|---|
| EP | 1022908 A1 | 7/2000 |
| EP | 1277680 A1 | 1/2003 |
| WO | WO 0158159 A1 * | 8/2001 |
| WO | WO-2004021138 A2 | 3/2004 |
| WO | WO-2004021138 A3 | 3/2004 |

OTHER PUBLICATIONS

Evain, J.-P., The Multimedia Home Platform—an overview, EBU Technical Department Review—Spring 1998.

ntl Group Ltd. 2000, Interactive Digital Television [online], [retrieved on Nov. 21, 2000]. Retrieved from the Internet <URL http://www.ntl.com/guides/digitaltv/interactive.asp>. 2 pages.

Pending United States patent application, "Automated Control of Interactive Application Execution Using Defined Time Periods," U.S. Appl. No. 09/431,001, filed Nov. 7, 1999.

Pending United States patent application, Automatic Control of Broadcast and Execution of Interactive Applications to Maintain Synchronous Operation With Broadcast Programs: U.S. Appl. No. 09/333,724, filed Jun. 15. 1999.

Pending United States patent application, "Automated Retirement of Interactive Applications Using Retirement instructions for Events and Program States," U.S. Appl. No. 09/334,131, filed Jun. 15, 1999.

Pending United States patent application, "Ensuring Reliable Delivery of Interactive Content," U.S. Appl. No. 09/754,650, filed Jan. 3, 2001.

Search Report PCT/US01/03591.

Statement from first named inventor concerning Cited Reference entitled "Pending United States patent application, "Automated Retirement of Interactive Applications Using Retirement instructions for Events and Program States,"U.S. Appl. No. 09/334,131, filed Jun. 15, 1999.".

Wink Communications, Technical Specification, mSubject: 5.2.17 ServerInfo Define, Dec. 31, 1995.

Wink WBS 3.1.14 Installation Plan & Maintenance Release, Aug. 24, 2001, Version 1.4.

"European application Serial No. 03749227.9 ,Supplementary Search Report mailed on Jan. 7, 2010", 5.

Kellerer, W, et al., "IP based enhanced data casting services over radio broadcast networks", *1st European Conference on Universal Multiservice Networks, 2000. ECUMN 2000.*, (2000), 195-203.

"Australian Application Serial No. 2003268273, Office Action mailed Sep. 21, 2006", 2 pgs.

"Australian Application Serial No. 2003268273, Response filed Jul. 9, 2007 to Office Action mailed Sep. 21, 2006", 44 pgs.

"European Application Serial No. 03749227.9, Office Action mailed Oct. 25, 2010", 8 pgs.

"European Application Serial No. 037492279, Response mailed Feb. 21, 2011 to Office Action mailed Oct. 25, 2010", 49 pgs.

Fuhrhop, C, et al., "Anwendungsentwicklungen Fuer Das Digitale Fernsehen", Fernseh Und Kino-Technik vol. 53, No. 10, XP000927044 ISSN: 1430-9947, (Oct. 1, 1999), 586-588,590.

Ladebusch, U, "Einfuehrung in den DVB-Datenrundfunk", Fernseh and Kino-Technik, vol. 52, No. 7, XP000870644, ISSN: 1430-9947, (Jul. 1, 1998), 425-432.

* cited by examiner

FIG. 3

CAROUSEL PROXY

CROSS-REFERENCE TO RELATED APPLICATION

This application claims the benefit of U.S. Provisional Application No. 60/407,325, filed Aug. 30, 2002, which is hereby incorporated by reference.

BACKGROUND OF THE INVENTION

1. Field of the Invention

This invention pertains in general to interactive television systems, and more particularly, to management of carousel data in such systems.

2. Description of the Related Art

Interactive television content is transmitted nationally by television networks. This content contains enhancements to existing television programming, usually consisting of graphical overlays on the screen, and dedicated channels consisting entirely of full-screen graphical interactive television services, referred to as "virtual channels." Examples of enhancements to existing television programming are an interactive television service to display sports scores and statistics during sports programming and an interactive television service to display biographies and trivia regarding the host and guests of a talk or variety show. Examples of virtual channels are a full-screen compact disc (CD) purchasing interactive television service and a full-screen weather information interactive television service.

This interactive television content is typically broadcast nationally along with the video and audio transmission. The content is received and re-transmitted at certain sites including uplink facilities for satellite television providers, and cable head-ends. These receipt and re-transmission sites are referred to as "local gateways."

The interactive television data that passes through a local gateway travels over a distribution network, such as a cable or satellite television network, to a television set-top box or other type of receiver. Different distribution networks often have different capabilities. E.g., a digital distribution system can support a higher data bandwidth than an analog system. Moreover, there are many different types of receivers, and each type typically supports a different set of interactive television functionalities. Due to these many potential variables, the nationally-distributed interactive television data is often not optimized for a given distribution system and/or set of receivers. In addition, the content is often not localized for a particular region.

Therefore, there is a need in the art for a way to tailor the interactive television data to the capabilities of given distribution networks and/or receivers, and for a way to localize the data.

BRIEF SUMMARY OF THE INVENTION

The above needs are met by a carousel proxy at the local gateway that modifies the carousel to tailor it to the distribution network, end-users, and/or receivers. In one embodiment, a broadcaster generates programming content and a carousel containing chunks of data defining one or more interactive applications. The broadcaster distributes the content and carousel to a local gateway. The local gateway distributes the programming content and a modified version of the carousel to end-users via a distribution network. The end-users use receivers to access the programming content and execute the interactive applications defined by the carousel.

A carousel proxy at the local gateway receives the inbound carousel from the broadcaster and modifies it to produce an outbound carousel suited to the distribution network, end-users, and/or receivers. A filtering module within the carousel proxy filters chunks and/or data within the chunks from the inbound carousel in order to customize the interactive application. In addition, a transformation module selectively transforms chunks and/or content within the chunks. The transformations include, for example, inserting localized or customized information into the interactive application, formatting data within the applications for the receivers, etc. In one embodiment, a local data store in communication with the carousel proxy stores instructions and data utilized by the carousel proxy to perform filtering, transforming, and/or other functions.

The carousel proxy includes a cache management module that manages a cache in the local data store. The cache holds chunks from the carousel. The cache management module enforces a caching policy derived from data within the local data store and/or received from the chunks in the inbound carousel. An outbound carousel control module uses the cached chunks to send chunks in the outbound carousel at a rate (i.e., frequency and/or period) optimized for the distribution network, end-users, and/or receivers. Thus, the carousel proxy sends the end-users interactive applications tailored to their respective environments.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE PREFERRED EMBODIMENTS

Figure 1:
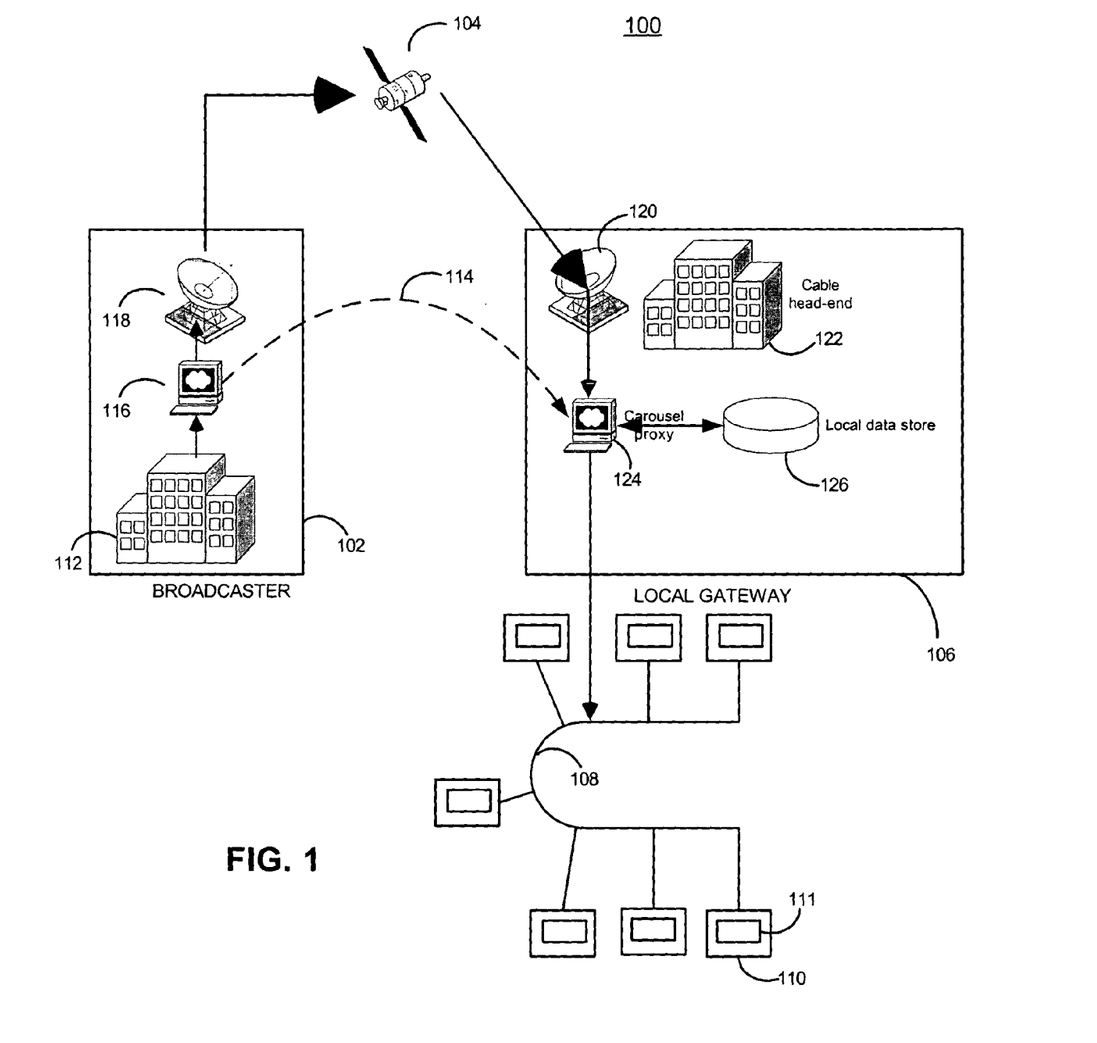
FIG. 1 is a high-level block diagram illustrating an interactive application broadcasting environment according to an embodiment of the present invention.

FIG. 1 is a high-level block diagram illustrating an interactive application broadcasting environment 100 according to an embodiment of the present invention. A broadcaster 102 broadcasts programming content and interactive applications via a transmission medium, such as the illustrated satellite 104 uplink, to a local gateway 106. The local gateway 106 transmits the programming content and interactive applications via a distribution network 108 to one or more end-users 110, another local gateway, and/or other locations. Receivers 111 at the end-users 110 execute the interactive applications and provide the end-users with an interactive media experience.

The broadcaster 102 typically utilizes a production facility 112 to produce the programming content. As used herein, "programming content" refers to audio and/or video content, such as television programs, radio programs, and/or other types of multimedia or single media content. Depending upon the embodiment, the broadcaster 102 is a television station, television network, a radio station, or any other entity that provides programming content. For purposes of clarity, this description assumes that the broadcaster 102 is a television station (or network) and the programming content is a television program.

The broadcaster 102 also provides interactive applications. In one embodiment, the broadcaster 102 generates the interactive applications itself. In another embodiment, the interactive applications are provided by another entity operating in concert with the broadcaster 102. One or more interactive application are often associated with a particular piece of programming content. For example, a television game show can have an associated interactive application that allows a television viewer to "play along" with the show. Similarly, a music video can have an associated interactive application that allows the viewer to purchase the music featured in the video. However, the interactive applications are not necessarily associated with a particular program. For example, an interactive application can provide general information such as weather and traffic reports.

The interactive application typically appears as a graphical display overlaying a television program displayed on a normal television channel. In addition, an interactive application can define a virtual channel that displays graphical information to a television viewer when "tuned" to that channel. For example, in interactive application can provide a virtual channel that provides movie start times at cinemas near the end-users 110.

In one embodiment, the broadcaster 102 broadcasts the interactive applications in-band with the programming content. An interactive application is "in-band" if it is in the same data stream as the programming content. In an embodiment where the broadcaster 102 provides an analog television output signal, the broadcaster typically encodes in-band interactive applications within the vertical blanking interval (VBI). In an embodiment where the broadcaster 102 provides a digital output signal, the broadcaster typically multiplexes in-band interactive applications within an MPEG-format signal. In another embodiment, the broadcaster 102 broadcasts the interactive applications out-of-band from the programming content. An interactive application is "out-of-band" if it is in a data stream not associated with the stream carrying the programming content. Examples of out-of-band transmissions include those utilizing a separate channel in a satellite broadcast, a TCP/IP network connection between the broadcaster 102 and the local gateway 106, and a dedicated data channel between the local gateway 106 and the receiver 111.

An interactive application is formed from one or more "chunks" of data that collectively define the application. The broadcaster 112 utilizes a carousel generator 116 to associate the chunks with the programming content. In one embodiment, the carousel generator 116 is the Wink Broadcast Server available from Wink Communications of San Francisco, Calif. In another embodiment, the carousel generator 116 is the OpenTV Streamer available from OpenTV Corp. of San Francisco, Calif.

The broadcaster 102 provides the carousel generator 116 with the chunks for one or more interactive applications and meta-data describing the chunks, the applications defined by the chunks, information about how to distribute the chunks/applications with the programming content, etc. The carousel generator 116 encodes the chunks with the programming content as specified by the meta-data. The carousel generator 116 has its name because it usually sends the chunks in a repeating cycle, so that a television receiver tuned to a given channel will eventually receive all of the chunks in the application. The cycle of chunks is referred to as "carousel data" 200 or simply as the "carousel." The carousel generator 116 may also include the meta-data provided by the broadcaster 102 in the carousel 200.

The broadcaster 102 sends the programming content and the carousel 200 to one or more local gateways 106. In the embodiment illustrated in FIG. 1, the broadcaster 102 uses a satellite uplink 118 to send the content and carousel 200 to a satellite 104 which then relays the data to a satellite downlink 120 at the local gateway 106. In one embodiment, the broadcaster 112 sends the carousel 200 to the local gateway 106 via an the out-of-band communication path 114. Other embodiments use different communication paths and associated hardware to transmit the content and carousel 200. Often, bandwidth over the communication path from the broadcaster 102 to the local gateway 106 is expensive and/or rare. Therefore, the broadcaster 102 often seeks to minimize the bandwidth required to transmit the carousel 200.

The local gateway 106 is a site that receives the programming content and carousel 200 and transmits both to one or more other locations, typically to end-users 110 coupled to the local gateway by a distribution network 108. In the illustrated embodiment, the local gateway 106 includes a cable television network head-end 122. The head-end is operated by a multiple system operator ("MSO," e.g., a cable television service provider) that distributes the content and carousel 200 to the end-users 110 via a cable distribution network 108. In another embodiment, the local gateway 106 is operated by a satellite television service provider and the distribution network 108, in turn, is a satellite-based network. In other embodiments, the local gateway 106 and/or distribution networks 108 are different than the ones described herein.

The local gateway 106 provides the inbound carousel 200 (whether received in-band or out-of-band) to a carousel proxy 124. The carousel proxy 124 alters the inbound carousel 200 in order to tailor it for the distribution network 108, receivers 111, and/or end-users 110. In order to perform this function, the carousel proxy 124 may utilize local data held in a local data store 126.

The local gateway 106 distributes the programming content and the outbound carousel 200 (i.e., the carousel generated by the carousel proxy 124) on the distribution network 108. As described above, this network 108 is an analog cable network, a digital cable network, a satellite-based wireless network, or any other network capable of transmitting the content and carousel 200 to the end-users. In the cable television embodiment, the distribution network 108 typically distributes the content and carousel 200 to end-users 110 within a localized geographic region. However, other networks, such as satellite-based networks, might serve geographically-diverse end-users 110.

The bandwidth for carrying the carousel 200 on the distribution network 108 is likely to be different than, and often exceeds, the bandwidth required to deliver the carousel 200 produced by the carousel generator 116 at the broadcaster 102. An analog distribution network 108 that sends the carousel 200 in the VBI supports a bandwidth of approximately 15 kilobits/second. The available bandwidth for an interactive application on a digital distribution network depends on how the total bandwidth is allocated, and can vary from approximately 15 kilobits/second to one megabit/second.

The end-users 110 have receivers 111 that receive the programming content and carousel 200 and execute the interactive applications. In one embodiment, the receiver 111 is a device for tuning and/or decoding the signals on the distribution network 108, executing the interactive applications, and displaying the programming content and/or interactive applications on a suitable display device such as a television. Such devices are often referred to as "set-top boxes" (STBs) because they often reside on top of television sets. However, the term "receiver" includes any device capable of executing the interactive application, and includes STBs for receiving cable or satellite-based signals, television sets, home computers, digital video recorders, radio receivers, etc.

Different types of receivers 111 provide different interactive application functionality. For example, advanced receivers 111 provide more powerful processing capabilities than less advanced receivers. Likewise, certain receivers 111 generate more advanced (e.g., higher resolution) graphical displays than other receivers.

Figure 2:
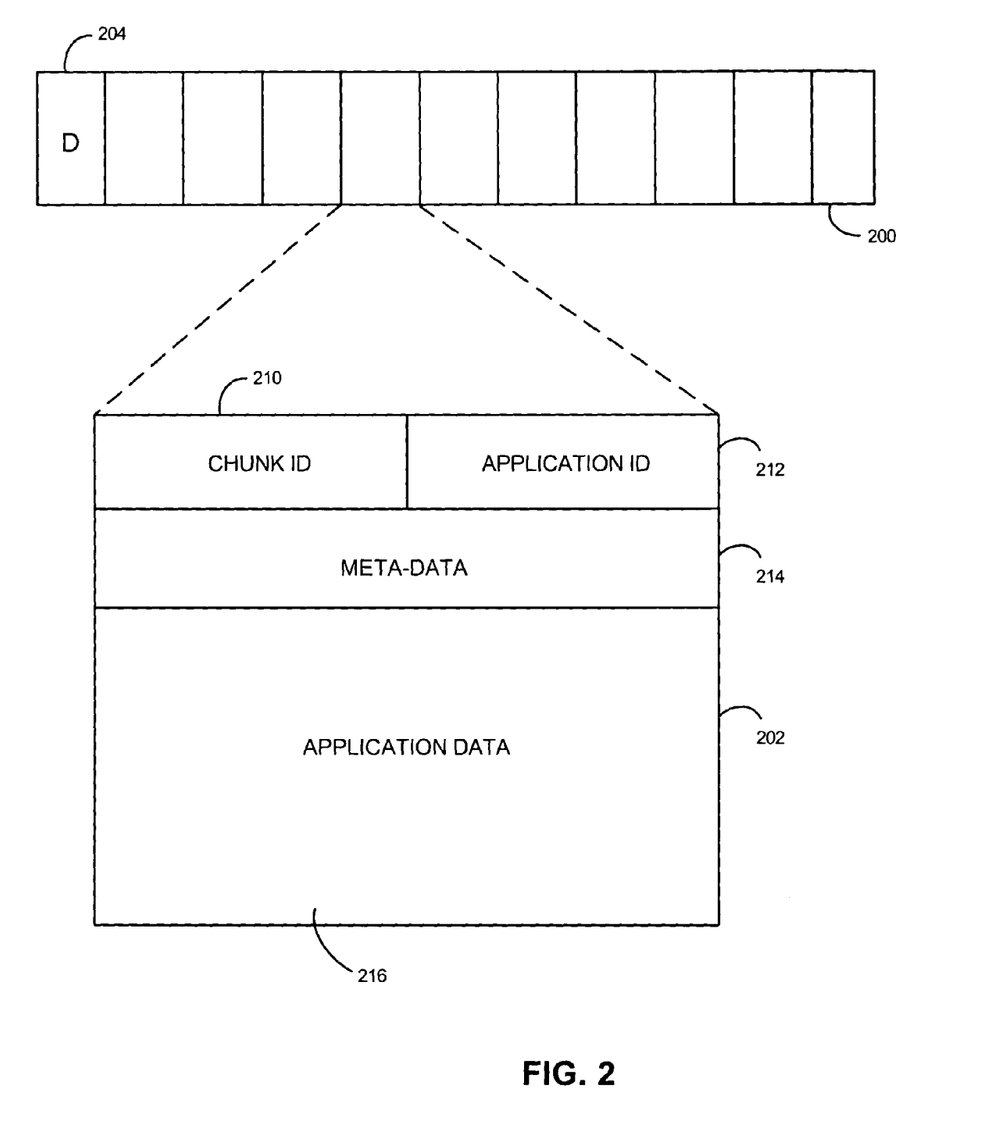
FIG. 2 is a block diagram illustrating a carousel and a chunk within the carousel.

FIG. 2 is a block diagram illustrating a carousel 200 and a chunk 202 within the carousel. The carousel 200 includes multiple chunks 202 that define one or more interactive applications. In one embodiment, each application in the carousel 200 includes one chunk 204 referred to as the "directory chunk" that holds data describing the characteristics of the application. These data indicate the number of chunks in the application, the types of data held in the chunks, etc. The other chunks hold the application data for the chunk. Depending upon the embodiment, the size of a chunk in the carousel 200 can range from approximately 10 bytes to 65 kilobytes or larger.

FIG. 2 also illustrates an expanded view of a typical (non-directory) chunk 202 of an interactive application according to one embodiment. The chunk 202 includes a chunk identification (ID) 210 that uniquely identifies the chunk. The chunk 202 also includes an application ID 212 that uniquely identifies the interactive application to which the chunk belongs.

Meta-data 214 within the chunk 202 describes characteristics of the chunk, the application data 216 within the chunk, and/or the interactive application. The meta-data 214 also describes how the carousel proxy 124 should process the chunk 202. For example, the meta-data can describe whether the carousel proxy 124 should filter the chunk from the carousel 200. The meta-data 214 can also describe whether the carousel proxy 124 should transform the application data 216 within the chunk 202 before sending it on the distribution network 108. The meta-data 214 can further describe the rate at which the chunk 202 should be broadcast in the carousel 200 and whether and/or when the carousel proxy 124 should cache the chunk. Other embodiments of chunks hold meta-data described different and/or additional characteristics of the chunks.

The application data 216 include executable code and data for the interactive application. Depending upon the chunk, the data 216 might include computer-readable instructions, graphical images stored in compressed or uncompressed formats, text strings, etc. The chunk 202 can include additional and/or different data than described herein.

Figure 3:
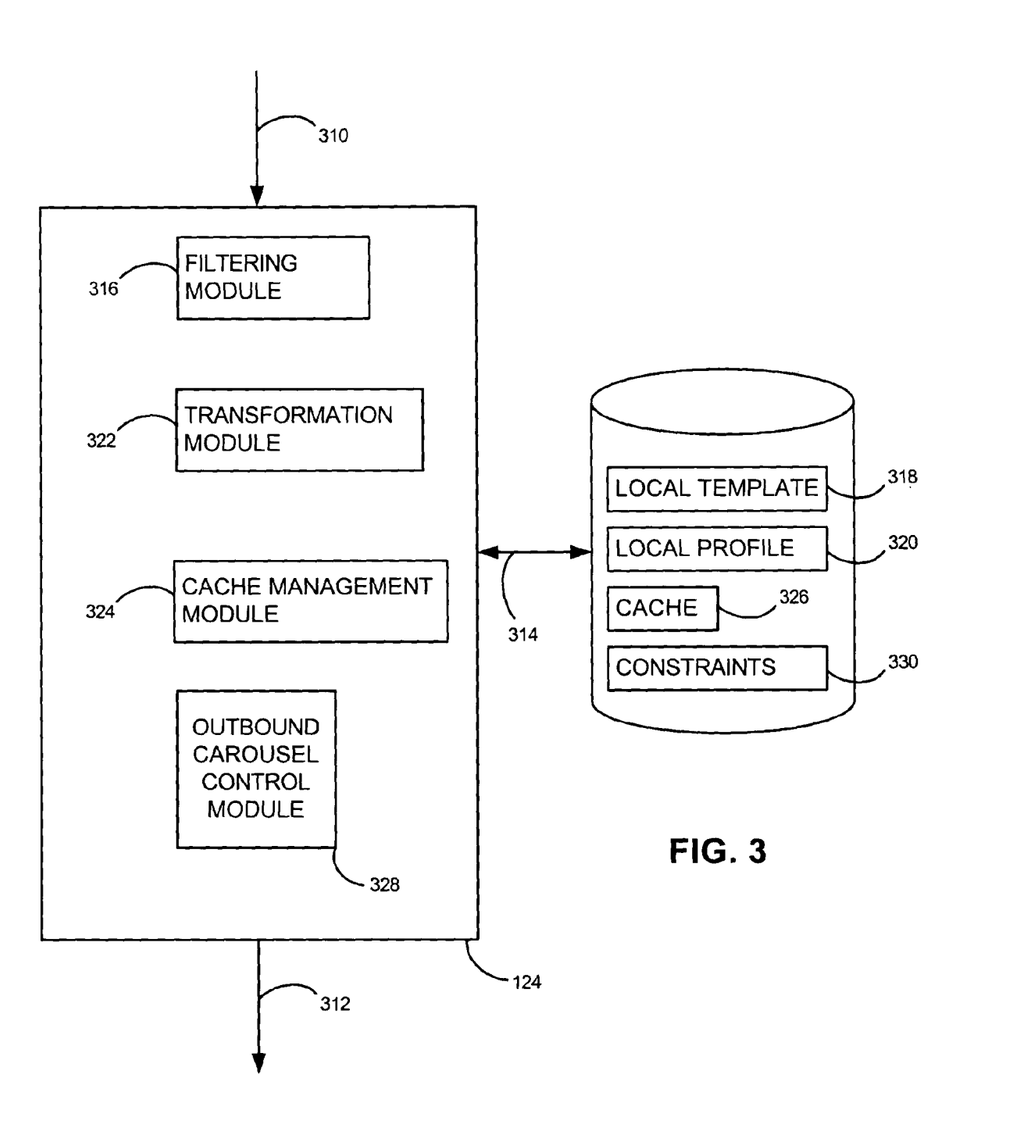
FIG. 3 is a block diagram illustrating the carousel proxy and local data store.

FIG. 3 is a block diagram illustrating a more detailed view of the carousel proxy 124 and local data store 126. The carousel proxy 124 has an input 310 for receiving the inbound carousel from the broadcaster 102 and an output 312 for outputting the outbound carousel. The outbound carousel is combined with the programming content and delivered to the end-users 110 via the distribution network 108. The carousel proxy 124 also has a bidirectional communications link 314 with the local data store 126.

In one embodiment, the carousel proxy 124 includes a conventional computer system having hardware and/or software for providing the functionality described herein. As is known in the art, a conventional computer system includes a processor, memory, storage device, etc. In one embodiment, the processor is a general-purpose processor such as an INTEL x86 compatible-CPU. The memory is, for example, firmware, read-only memory (ROM), non-volatile random access memory (NVRAM), and/or RAM, and holds instructions and data used by the processor. The storage device is a hard disk drive and/or another device capable of storing data, such as a compact disk (CD), DVD, or solid-state memory device. In one embodiment, the storage device holds the local data store 126. In another embodiment, the local data store 126 is external to the computer system and connected via a high-speed interface.

The computer system acting as the carousel proxy 124 is adapted to execute computer program modules. As used herein, the term "module" refers to computer program logic for providing the specified functionality. A module can be implemented in hardware, firmware, and/or software. In one embodiment, the modules are stored on the storage device. When utilized, the modules are loaded into the memory and executed by the processor.

In one embodiment, the carousel proxy 124 includes a filtering module 316 for filtering chunks 202 out of the inbound carousel and/or application data 216 from the chunks. Some receivers 111 at the end-users 110 have limited memory. Similarly, some distribution networks 108 have limited bandwidth. If these constraints are present, one embodiment of the carousel proxy 124 utilizes the filtering module 316 to reduce the resources required to transmit and/or execute the interactive application.

In one embodiment, the filtering module 316 utilizes instructions and/or data stored within a local template module 318 in the local data store 126. The local template module 318 specifies which chunks 202 and/or application data 216 the filtering module 316 should remove from the inbound carousel in order to optimize the outbound carousel for the distribution network 108 and/or receivers 111. The local template module 318 can specify specific filtering rules for specific interactive applications, and can also specify filtering rules that the filtering module 316 applies to all applications/chunks. In one example of the latter rules, the local template module 318 specifies that the filtering module 316 remove all images larger than 50 kilobytes from the chunks 202 in the inbound carousel.

In one embodiment, the filtering module 316 filters the inbound carousel 200 in response to instructions and/or data stored in a local profile module 320 in the local data store 126. The local profile module 320 stores one or more profiles describing the end-users 110 and/or the receivers 111 on the distribution network 108. For example, the local profile module 320 can store geographic, demographic, and/or psychographic data about the end-users. Such data describe the end-users' geographic location(s), relative wealth, political leanings, level of education, primary language(s), average age, etc. The local profile module 320 can also store data describing the television channels available to the end-users 110, the available bandwidth on the distribution network 108, the capabilities of the receivers 111 at the end-users, etc. In one embodiment, the local profile module 320 stores data indicating one or more groups to which the carousel proxy 124 belongs.

Meta-data 214 within the chunks 202 describes the one or more local profiles for which the chunks, interactive applications, and/or application data 216 are applicable. The filtering module 316 analyzes this meta-data 214 in view of the data in the local profile 320 and filters out chunks, interactive applications, and/or application data that are inapplicable to the local profile. In another embodiment, the filtering module 316 analyzes the application data 216, rather than the meta-data, to determine whether to filter the chunks 202, interactive applications, and/or application data out of the carousel 200. For example, assume there are three groups to which the carousel proxy 124 can potentially belong, and the local profile module 320 indicates that the carousel proxy belongs to the first group. The filtering module 316 analyzes the meta-data and/or application data 216 in the chunks to determine whether the chunks 202, interactive applications, and/or application data are applicable to group one and filters inapplicable data from the inbound carousel.

In one embodiment, the carousel proxy 124 includes a transformation module 322 for transforming application data 216 and meta-data 214 within the chunks 202. A chunk's meta-data 214 and/or application data 216 can contain instructions that the transformation module 124 executes to modify the incoming carousel application data 216. Similarly, a chunk's meta-data 214 and/or application data 216 can include special symbols or fields that the transformation module 322 "knows" how to modify. The modification can make use of data stored within the carousel proxy 124, chunks 202, local template 318, local profile 320, elsewhere within the local data store 126, and/or from a remote data store.

The transformation module 322 is data-driven, and can perform both simple and complex transformations of data 216 and meta-data 214. For example, the chunk 202 can utilize a syntax that identifies instructions and/or variable names with control characters and/or strings such as "%%." The transformation module 322 identifies and executes instructions and/or replaces the variable names with the appropriate data. Thus, the transformation module 322 can transform the string "Call your nearest ACME dealer at %%print(ACME_NUMBER)%%" into "Call your nearest ACME dealer at 555-1234." The transformation module 322 uses similar techniques to replace other data elements. For example, the module 322 can replace national news with local news, and/or replace national logos with local logos.

In one embodiment, the transformation module 322 transforms a partial application in the inbound carousel into a complete application by adding chunks 202 and/or application data 216 to the carousel as it passes through the carousel proxy 124. For example, the broadcaster 102 can send chunks 202 containing only sports scores and meta-data. Upon receipt of these chunks 202, the transformation module 322 uses the meta-data to identify an interactive application for displaying the sports scores stored in the local data store 126 (or elsewhere). The transformation module 322 creates an outbound carousel integrating the sports scores and interactive application so that the scores display at the end-users 110.

Moreover, the transformation module 322 also transforms representations of data within the chunks 202. One embodiment of the transformation module 322 converts images between different representations, such as between compressed formats (e.g., JPEG) and uncompressed formats (e.g., bitmap). In another example, the transformation module 322 converts among markup languages, such as converting an hypertext markup language (HTML) page into the H20 format utilized by the OpenTV Corp. interactive television system.

In one embodiment, the carousel proxy 124 includes a cache management module 324 for managing a chunk cache 326 in the local data store 126. The chunk cache 326 caches chunks 202 received in the inbound carousel and enforces a caching policy that optimizes the operation of the cache 326 and carousel proxy 124. In one embodiment, the cache 326 caches data at the chunk 202, interactive application, and/or global levels. That is, the cache management module 324 can apply different caching policies to specific chunks 202 and/or specific applications, or the module can apply the same policy to all chunks and/or applications.

In one embodiment, meta-data 214 within the chunks 202 indicate whether the cache management module 324 should cache particular chunks and/or applications. For example, if a chunk 202 will be sent on the carousel 200 only a few times, it is usually not optimal to cache the chunk. Therefore, a tag in the chunk's meta-data 214 can designate the chunk as non-cacheable. The cache management module 324 recognizes the tag and does not cache the chunk. Similarly, meta-data 214 in the chunks 202 of an interactive application can specify optimal caching rules for the application. For example, if the interactive application displays sports scores, the application can specify that the cache management module 324 cache the chunks 202 comprising the application but not cache the chunks containing sports scores because the sports scores will be updated frequently by new chunks.

The cache management module 324 sets cache expiration policies at the chunk, application, and/or global levels based on data stored in the carousel proxy 124, local data store 126, and or meta-data 214 contained in the chunks 202. The expiration policies specify whether or when the cached chunks 202 and/or applications expire (i.e., are deleted from the cache 326). For example, the chunks 202 and/or applications can be set to never expire, expire upon the occurrence of an event (e.g., the arrival of an updated chunk in the inbound carousel), expire after a certain time period, etc.

An outbound carousel control module 328 within the carousel proxy 124 controls the rate (i.e., order and frequency of chunks 202) of the outbound carousel. As described above, the inbound carousel often utilizes less than the full bandwidth available on the distribution network 108. The outbound carousel control module 328 uses the cached chunks 202 to decouple the inbound carousel rate from the outbound rate, thereby allowing the outbound carousel to take advantage of the larger bandwidth available on the distribution network 108. The outbound carousel control module 328 inserts chunks 202 in the outbound carousel 200 at a rate that optimizes the carousel delivery to the end-users 110.

In one embodiment, a constraints module 330 in the local data store 126 specifies constraints that the outbound carousel control module 328 utilizes to generate the outbound carousel. For example, the constraints module 330 can specify that the outbound carousel control module 328 send out new chunks 202 (i.e., chunks in the inbound carousel that have not been previously sent in the outbound carousel) as soon as possible and/or that it send chunks at the maximum rate that will not overload the receivers 111 at the end-users 110.

In one embodiment, the outbound carousel control module 328 utilizes meta-data 214 stored in the chunks 202 to determine the outbound carousel. The meta-data 214 can include constraints specifying how and/or when the outbound carousel control module 328 should send the chunks 202. The meta-data 214 can also include hints that specify non-mandatory recommendations about how and/or when the outbound carousel control module 328 should send the chunks 202. The constraints and hints can specify, for example, whether the frequency of the chunk 202 can or should be changed, the frequency at which the chunk should be sent, time constraints for sending two or more chunks (e.g., do not send two given chunks more than N seconds apart, send N given chunks together), the number of times that a chunk should be sent, specific orders in which the chunks should be sent, etc.

In one embodiment, the outbound carousel control module 328 sends chunks 202 in the outbound carousel at rates that approximate the inbound rates of the chunks. The outbound carousel control module 328 measures the frequency of a particular chunk 202 in the inbound carousel 200 and assigns that chunk an equivalent frequency in the outbound carousel. For example, if the chunk 202 appears once every 10 seconds in the inbound carousel, and the bandwidth of the outbound carousel is twice the bandwidth of the inbound carousel, the outbound carousel control module 328 broadcasts the chunk in the outbound carousel once every five seconds.

The outbound carousel control module 328 can also send chunks 202 in the outbound carousel at rates different than the inbound carousel rates. For example, assume that a first chunk (or interactive application) appears every two seconds in the inbound carousel and a second chunk appears every 10 seconds. If the outbound carousel bandwidth is twice that of the inbound carousel, the outbound carousel control module 328 can send the first chunk every second and the second chunk every five seconds. Assume for this example that it is desirable to reallocate the available bandwidth to give the second chunk a higher priority. The outbound carousel control module 328 fulfills this desire by keeping the frequency of the first chunk at once every two seconds and increasing the frequency of the second chunk to once every three seconds.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

We claim:

1. A gateway to distribute programming content and one or more interactive applications, the gateway comprising:
   a local data store configured to store local data, the local data store comprising a cache to cache one or more of a plurality of chunks of an inbound carousel, the plurality of chunks including a cache indication indicating which of the plurality of chunks are to be cached;
   a cache management module configured to selectively cache the one or more chunks based on the cache indication included in the plurality of chunks;
   a carousel proxy in communication with the local data store, the carousel proxy configuring one or more processors to:
      receive the inbound carousel, the inbound carousel comprising the plurality of chunks, a first chunk in the plurality of chunks to hold data describing characteristics of an interactive application and further one or more chunks to hold application data of the interactive application, and
      modify the inbound carousel utilizing data stored in the local data store to produce an outbound carousel optimized for transmission to a distribution network; and
   an outbound carousel control module configured to optimize a rate at which chunks are to be sent in the outbound carousel.

2. The gateway of claim 1, wherein the carousel proxy comprises: a filtering module to selectively remove data from the inbound carousel to produce the outbound carousel.

3. The gateway of claim 2, wherein:
   the local data store comprises a module specifying filtering rules for the inbound carousel; and
   the filtering module is adapted to selectively remove data from the inbound carousel responsive to the filtering rules.

4. The gateway of claim 3, wherein the module specifying filtering rules specifies characteristics of receivers and/or end-users receiving the outbound carousel via the distribution network and wherein the filtering module is adapted to remove from the inbound carousel data not meeting the specified characteristics.

5. The gateway of claim 1, wherein the carousel proxy comprises:
   a transformation module adapted to selectively transform data in the inbound carousel to produce the outbound carousel.

6. The gateway of claim 1, wherein:
   the outbound carousel control module is to optimize the rate of chunks in the outbound carousel in response to the bandwidth available on the distribution network.

7. The local gateway of claim 1, comprising:
   the outbound carousel control module is to place chunks in the outbound carousel responsive to delivery information provided in the plurality of chunks.

8. The local gateway of claim 1, comprising:
   the outbound carousel control module is to place chunks in the outbound carousel at rates determined in response to a rate of chunks in the inbound carousel.

9. The gateway of claim 1, wherein the cache management module is further to specify an expiration instruction based on meta-data contained in the chunks.

10. A method of producing an outbound carousel defining an interactive application, the method comprising:
    receiving an inbound carousel having a plurality of chunks defining the interactive application, a first chunk in the plurality of chunks to hold data describing characteristics of an interactive application and further one or more chunks to hold application data of the interactive application, the plurality of chunks including a cache indication indicating which of the plurality of chunks are to be cached;
    selectively caching the one or more chunks based on the cache indication included in the plurality of chunks;
    modifying chunks from the plurality of chunks in the inbound carousel responsive to data stored in a local data store to produce the outbound carousel, the modifying of the chunks being performed by one or more processors;
    optimizing a rate at which chunks are to be sent in the outbound carousel; and
    providing the outbound carousel to a distribution network for delivery to end-users.

11. The method of claim 10, wherein the modifying of the chunks in the inbound carousel comprises:
    filtering chunks from the inbound carousel to produce the outbound carousel.

12. The method of claim 10, wherein the modifying of the chunks in the inbound carousel comprises:
    filtering chunks responsive to filtering rules specifying characteristics of receivers and/or end-users receiving the outbound carousel via the distribution network.

13. The method of claim 10, wherein the modifying of the chunks in the inbound carousel comprises:
    transforming the application data of the interactive application within the plurality of chunks of the inbound carousel to produce transformed application data of the interactive application within one or more chunks of the outbound carousel.

14. The method of claim 10, wherein the modifying of the chunks in the inbound carousel wherein:
    the optimizing of the rate of the chunks in the outbound carousel is responsive to an amount of bandwidth available on the distribution network.

15. The method of claim 10, wherein one or more chunks from the plurality of chunks in the inbound carousel comprise meta-data specifying delivery information for the plurality of chunks and the modifying of the chunks in the inbound carousel comprises: placing chunks in the outbound carousel at a rate determined responsive to the delivery information.

16. The method of claim 10, wherein the modifying of the chunks in the inbound carousel comprises:
    placing chunks in the outbound carousel at rates determined responsive to a rate of the plurality of chunks in the inbound carousel.

17. The method of claim 10, further comprising specifying an expiration instruction based on meta-data contained in the chunks.

* * * * *

UNITED STATES PATENT AND TRADEMARK OFFICE
CERTIFICATE OF CORRECTION

| | | |
|---|---|---|
| PATENT NO. | : 8,201,208 B2 | Page 1 of 2 |
| APPLICATION NO. | : 10/652850 | |
| DATED | : June 12, 2012 | |
| INVENTOR(S) | : Delpuch et al. | |

It is certified that error appears in the above-identified patent and that said Letters Patent is hereby corrected as shown below:

Title Page, item (56);

On the face page 1, under "Other Publications", in column 2, line 1, before "Advanced", insert -- "--, therefor On the face page 1, under "Other Publications", in column 2, line 1, after "(ATVEF)", insert --"--, therefor On the face page 2, under "Other Publications", in column 2, line 1, delete "J.-P.", and insert --J. P.--, therefor On the face page 2, under "Other Publications", in column 2, line 1, before "The" insert --"--, therefor On the face page 2, under "Other Publications", in column 2, line 1, after "overview" insert --"--, therefor On the face page 2, under "Other Publications", in column 2, line 3, before "Interactive", insert --"--, therefor On the face page 2, under "Other Publications", in column 2, line 4, after "2000].", insert --"--, therefor On the face page 2, under "Other Publications", in column 2, line 5, after "asp>", delete ".", and insert --,--, therefor On the face page 2, under "Other Publications", in column 2, line 9, before "Automatic", insert --"--, therefor Signed and Sealed this
Twenty-fifth Day of September, 2012

David J. Kappos
*Director of the United States Patent and Trademark Office*

CERTIFICATE OF CORRECTION (continued)
U.S. Pat. No. 8,201,208 B2

On the face page 2, under "Other Publications", in column 2, line 11, after "Programs", delete ":", and insert --",--, therefor On the face page 2, under "Other Publications", in column 2, line 12, delete "15. 1999", and insert --15, 1999--, therefor On the face page 2, under "Other Publications", in column 2, line 23, delete "States,"U.S", and insert --States", U.S--, therefor On the face page 2, under "Other Publications", in column 2, line 24, delete "1999".", and insert --1999".--, therefor On the face page 2, under "Other Publications", in column 2, line 29, delete "03749227.9 ,", and insert --03749227.9,"--, therefor On the face page 2, under "Other Publications", in column 2, line 30, after "5.", insert --pgs.--, therefor On the face page 2, under "Other Publications", in column 2, line 31, delete "W", and insert --W.--, therefor On the face page 2, under "Other Publications", in column 2, line 33, delete "2000.,", and insert --2000,--, therefor On the face page 2, under "Other Publications", in column 2, line 40, delete "037492279", and insert --03749227.9--, therefor On the face page 2, under "Other Publications", in column 2, line 40, delete "mailed", and insert --filed--, therefor On the face page 2, under "Other Publications", in column 2, line 42, delete "C,", and insert --C.,--, therefor On the face page 2, under "Other Publications", in column 2, line 44, delete "586-588,590", and insert --586-588, 590--, therefor On the face page 2, under "Other Publications", in column 2, line 45, delete "U", and insert --U.--, therefor In column 9, line 41, in Claim 2, after "comprises:", insert --¶--, therefor In column 10, line 52, in Claim 15, after "comprises:", insert --¶--, therefor